(12) United States Patent
Feith et al.

(10) Patent No.: US 6,921,127 B2
(45) Date of Patent: Jul. 26, 2005

(54) STRUCTURAL PART FOR A MOTOR VEHICLE

(75) Inventors: Thomas Feith, Korntal-Muenchingen (DE); Sabine Neuss, Freiberg/Neckar (DE); Thomas Reddig, Bietigheim-Bissingen (DE); Walter Wolf, Oppenweiler-Zell (DE)

(73) Assignee: BEHR GmbH & Co., Stuttgart (DE)

( * ) Notice: Subject to any disclaimer, the term of this patent is extended or adjusted under 35 U.S.C. 154(b) by 0 days.

(21) Appl. No.: 10/111,570

(22) PCT Filed: Aug. 30, 2001

(86) PCT No.: PCT/EP01/10024

§ 371 (c)(1),
(2), (4) Date: Apr. 26, 2002

(87) PCT Pub. No.: WO02/20334

PCT Pub. Date: Mar. 14, 2002

(65) Prior Publication Data

US 2002/0153750 A1 Oct. 24, 2002

(30) Foreign Application Priority Data

Sep. 7, 2000 (DE) .......................................... 100-44-292
Dec. 22, 2000 (DE) .......................................... 100-64-522

(51) Int. Cl.[7] ............................................. B62D 25/08
(52) U.S. Cl. ..................... 296/193.02; 296/208; 296/70
(58) Field of Search ....................... 296/193.02, 203.02, 296/208, 70, 72, 194

(56) References Cited

U.S. PATENT DOCUMENTS

| | | | | |
|---|---|---|---|---|
| 2,664,373 A | * | 12/1953 | Reilly ......................... 156/286 |
| 3,372,462 A | * | 3/1968 | Reid et al. ..................... 29/447 |
| 3,885,521 A | * | 5/1975 | von Arx ...................... 118/105 |
| 3,934,064 A | * | 1/1976 | Lowthian ..................... 428/36 |
| 4,272,971 A | * | 6/1981 | Loyd et al. .................. 464/181 |
| 4,329,879 A | * | 5/1982 | Appel et al. |
| 4,347,277 A | * | 8/1982 | Slama et al. ................ 428/215 |
| 4,403,933 A | * | 9/1983 | Davis et al. |
| 4,592,886 A | * | 6/1986 | Mannherz |
| 4,615,411 A | * | 10/1986 | Breitscheidel et al. ...... 181/224 |
| 5,566,721 A | * | 10/1996 | Breese ........................ 138/145 |
| 5,823,602 A | * | 10/1998 | Kelman et al. ............... 296/70 |
| 6,186,885 B1 | | 2/2001 | Ahn et al. |
| 6,186,887 B1 | | 2/2001 | Dauvergne |
| 6,276,739 B1 | | 8/2001 | Wich |
| 6,592,069 B1 | * | 7/2003 | Cobble |

FOREIGN PATENT DOCUMENTS

| | | |
|---|---|---|
| DE | 42 32 847 | 3/1994 |
| DE | 197 53 877 | 6/1998 |
| DE | 197 20 902 | 11/1998 |
| DE | 198 12 288 | 5/1999 |
| DE | 299 16 470 U | 1/2000 |
| DE | 100 04 751 | 8/2000 |
| DE | 200 08 201 U | 8/2000 |
| DE | 100 05 718 | 8/2001 |
| EP | 0 370 342 | 5/1990 |
| FR | 2 789 043 | 8/2000 |

* cited by examiner

Primary Examiner—Dennis H. Pedder
(74) Attorney, Agent, or Firm—Foley & Lardner LLP

(57) ABSTRACT

The invention relates to a component, in particular a cross-member for arranging between A-pillars of a motor vehicle, having an essentially tubular base body in which at least one duct is provided. In order to provide an improved light-weight component which can be produced in a more simple manner using fewer working steps and therefore more cost-effectively and in which, in an advantageous manner, a duct can be integrated, it is proposed that the base body is lined on the inside with plastic in order to form duct walls consisting of plastic.

The component according to the invention is used as a dashboard support in a motor vehicle.

39 Claims, 19 Drawing Sheets

STRUCTURAL PART FOR A MOTOR VEHICLE

The invention relates to a component for a motor vehicle, in particular a crossmember for the cockpit region, in accordance with the preamble of claim 1 and also to a production process and to uses of this component.

Crossmembers comprising pipes which consist of metal and have appropriately large wall thicknesses, so that sufficient resistance to bending, buckling and torsion, and hence sufficient pressure load-bearing capacity, is provided, are known from the motor vehicle industry. Said crossmembers result in a high weight and disadvantages in terms of costs. The pipes can in principle be used for guiding air, for example from an air conditioning system arranged centrally in the vehicle to lateral discharging means (see, for example, DE 197 53 877), this not being made use of to date, since undesirable condensation water can easily be deposited on the metal pipes.

Furthermore, crossmembers are known which are of two-shell construction with webs welded into it for stabilization purposes. A crossmember of this type is disclosed, for example, in DE 197 20 902. Crossmembers of this type are very expensive to produce and have a high weight. Guiding of air is not possible.

EP 0 370 342 discloses a lightweight component in a hybrid construction which can be used as a support in the motor vehicle and which has a shell-shaped base body which preferably consists of metal and in whose interior reinforcing ribs are arranged. The reinforcing ribs consist of injected plastic and are connected to the metal base body at discrete connecting points by the plastic penetrating apertures arranged in the metal part and extending beyond the surfaces of the apertures. The metal base body is of U-shaped design and the reinforcing ribs penetrate the interior of the base body in order to obtain great stiffness and strength. This known hybrid component has an advantageously low weight while at the same time having sufficient strength, stiffness and load-bearing capacity. Guiding of air by means of this lightweight component which can be used as a support is not possible.

DE-U 200 08 201 discloses a crossmember of hybrid construction having a shell-like base body which is stiffened by an injected plastic ribbed arrangement. The plastic ribs are formed in such a manner that a plastic pipe serving as an air duct can be inserted in a form-fitting manner. Introducing a duct in this manner is costly, since the duct has to be produced separately and inserted in a working step. The ribs which are matched in their shape in such a manner lose stability.

DE-U 299 16 470 discloses a further crossmember, in which a plastic air duct is encased by two metal shells forming the crossmember. At the basis of a construction of this type is the problem of the fixed connection of the two metal shells, since the encased plastic, for example because of its weak temperature stability, prevents the metal shells from being welded together. Furthermore, it is disadvantageous that the plastic pipe and the metal shells have to be manufactured in individual working steps and then joined together in a further working step.

Based on this prior art, it is the object of the invention to provide an improved lightweight component which can be produced in a more simple manner using fewer working steps and therefore more cost-effectively and in which, in an advantageous manner, a duct can be integrated, and also to specify a production process and uses of the component.

This object is achieved by an article having the features of claim 1 and uses having the features of claims 15 and 16 and also by a production process having the features of claim 17.

According to the invention, the base body is lined on the inside with plastic, so that the duct walls are formed from plastic. Additional air guiding components, such as blowing components, air hoses or the like, are no longer necessary. The wall thickness of the base body, which generally consists of metal, can be reduced, as a result of which weight can be saved. No, or at least less, condensation from moisture contained in the conditioned air can occur on the duct walls which consist of plastic on the inside. The same is true for the condensation on the outside of the duct. Other media, such as wiping water for the headlights or the windshield, cooling water, oil, compressed air or the like, could also be guided or stored in the duct. Similarly, the duct can also be used for the protected laying of cables, a gasoline line, an oil line, compressed air lines or the like or for storing objects.

In the production of the component according to the invention, in a cost-effective and simple manner essentially just the base body is inserted into a mold and, by molding on the plastic, the base body is lined, with the result that a suitable duct, for example an air duct is formed.

The component according to the invention has the further advantage that, in comparison to the known components in which a combination of metal and plastic is also used, the invention can now make use of a less expensive plastic, since the plastic in the component according to the invention does not need to have a substantial strength function. The plastic is mainly used for insulation, for example for thermal or sound insulation. The strength arises from the bond of the base body and plastic, a synergistic effect therefore being achieved. Thus, for example in comparison with previously known components, a thinner sheet metal and more cost-effective plastic can be used.

The base body advantageously has apertures which are penetrated by the plastic, and securing means, connection points or housing parts of a heating or air conditioning system or similar elements consisting of the plastic are molded integrally onto the base body. The apertures enable the base body to be connected fixedly to the plastic, in a similar manner as in the case of a component of hybrid construction, with the result that the component according to the invention likewise has an advantageously lower weight. So that duct walls of the duct formed by the base body remain closed, however, these apertures are closed by the plastic. At the same time, securing means, connection points or, for example, also housing parts of an air conditioning system, can be molded on during the introduction of the plastic, with the result that a dashboard support having a crossmember can be obtained a single process step, said dashboard support being lightweight, having a multiplicity of connection points and securing means and, if appropriate, even housing parts already, and in which an air duct, for example for guiding conditioned air, is contained.

In one exemplary embodiment, the plastic can be introduced in an injection molding process. A plastic introduced in such a manner can be designed to be relatively strong and can also exert retaining functions.

If the plastic may have a lower strength, it can consist of a foam material, for example a polyurethane foam or particle foam.

The plastic which is very lightweight and nevertheless has a high strength consists of foam particles which are connected to one another via a binding agent. A composite plastic of this type is commercially available under the trademark "Xeratec", for example.

The component preferably forms a crossmember which is to be arranged between the A-pillars of the vehicle and to which the dashboard and further components, such as the steering column, airbag or the like, can be connected.

Altogether, the multiplicity of parts is reduced in the manufacturing of the motor vehicle, since the component according to the invention, for example as a dashboard support, can contain all of these securing means and air ducts and part of the housing of the air conditioning system. This enables installation time and working effort to be saved, and an advantageous preliminary testing of the component is made possible.

In order to increase the stiffness of the component, integrally molded-on plastic ribs can be provided.

Connection points, such as, for example, the connections to A-pillars of a vehicle, have to be very stable and should therefore consist of metal. In one refinement of the invention, connection elements of this type can therefore be connected to the base body, by welding, clinching or other joining methods, before the plastic is introduced. They could be further stabilized, for example, via plastic ribs.

In one embodiment of the invention, the tubular base body is formed from two half shells which are connected to each other via the introduced plastic. Tubular crossmembers having their many connection points for the steering column, airbag, etc., can be produced more cost-effectively from two half shells. According to the invention, however, the two half shells do not have to be connected to each other in advance, but can be inserted into the mold as half shells They can then optionally be connected first of all mechanically to each other, for example by calking, in the mold. The half shells are advantageously connected to each other additionally, or even exclusively, via the introduced plastic, for example in the manner of rivets, with the result that the plastic forms rivets, among other things. For this purpose, of course, appropriate openings have to be provided in the half shells, said openings being filled with the plastic.

In order to make possible an advantageous flowing of the plastic in the production process, in a development of the invention vents are provided between the adjacent edges of the two half shells, which vents can at least partially be filled with plastic in the production process.

In order to make it possible for the plastic to flow as uniformly as possible, the vents are arranged at a distance from one another in the longitudinal direction and, in an advantageous manner, in at least one of the half shells, as seen in the longitudinal direction, a filling option is provided in each case between two vents.

Depending on the configuration of the edges of the half shells, the adjacent edges may form connection points for further components.

The component according to the invention is preferably used as a crossmember in a motor vehicle, the duct being an air guiding duct and/or a cable duct. As an alternative, the component could be used as a crossmember arranged underneath a windshield in a motor vehicle, the duct being an air guiding duct for guiding the defrosting air to be supplied to the windshield, for deicing purposes or for heating a wiper blade resting place, and/or to the side windows. A further option for use of the component according to the invention is as a crossmember in front end region of the motor vehicle, the duct being a cable duct or forming a container for a medium, such as wiping water for the headlamps or the windshield, cooling water, oil, compressed air or the like, or forming a duct for protected laying of gasoline lines, oil lines, compressed air lines or the like. The component according to the invention could also be used as a rear end or rear closure module.

The process according to the invention for producing the component is distinguished by the following process steps:

forming the base body with the appropriate openings and/or apertures attaching the securing means, which consist of material of the base body, onto the base body inserting the base body/bodies into a mold molding, for example injection molding, all of the plastic parts and plastic linings onto the base body in a single process step.

The few process steps mean that the process according to the invention is particularly cost-effective.

In one design of the invention, the duct of the component can be formed by a mold core in the process step of introducing the plastic, which is particularly advantageous if the plastic is injected under pressure. If the plastic is introduced without pressure, for example by casting, a blown core, a filled shaped tube, gases, granules, a fusible core or a lost core can be used.

In the following text, the invention will be explained in detail using exemplary embodiments and with reference to the drawing, in which.

Figure 11A:
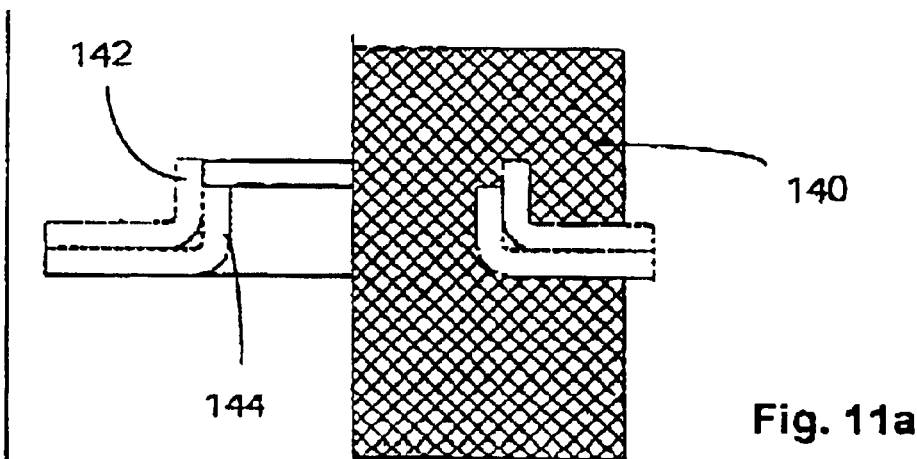
Figure 11B:
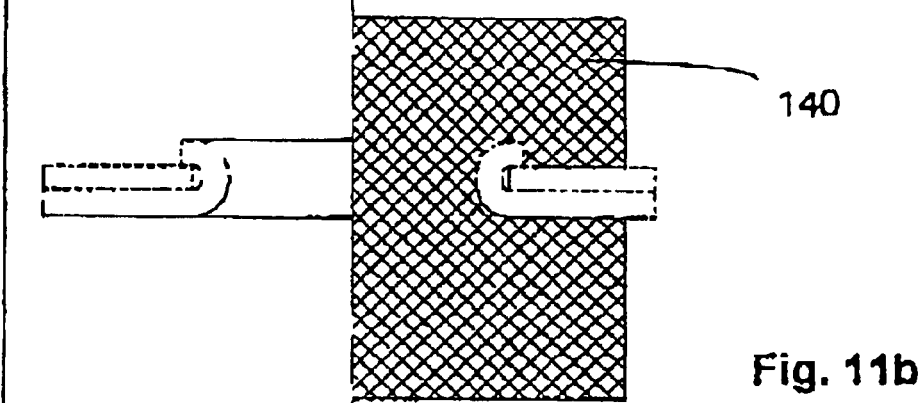
Figure 11C:
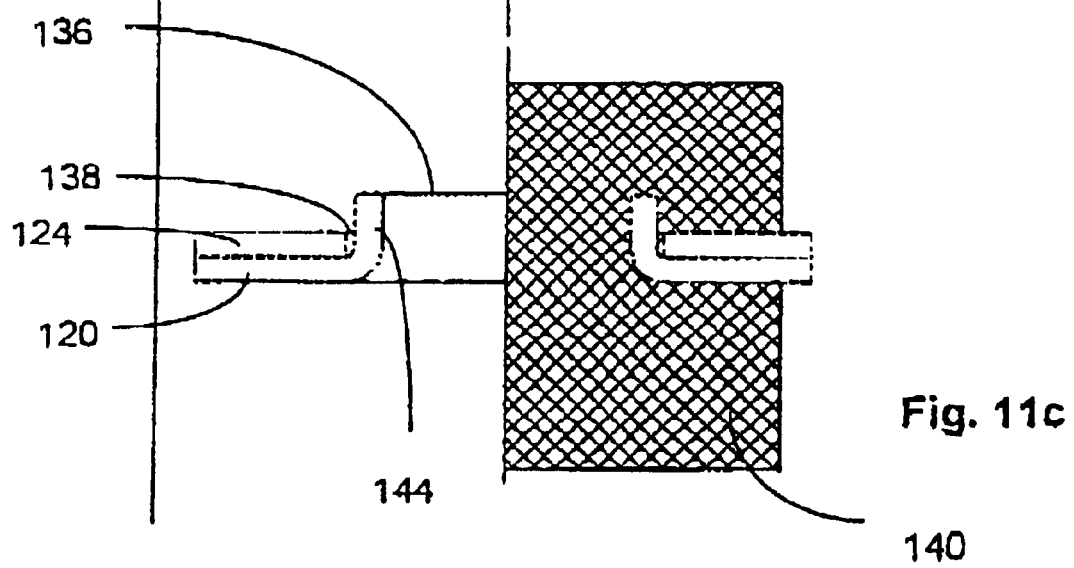

FIGS. 11a to c and

Figure 12A:
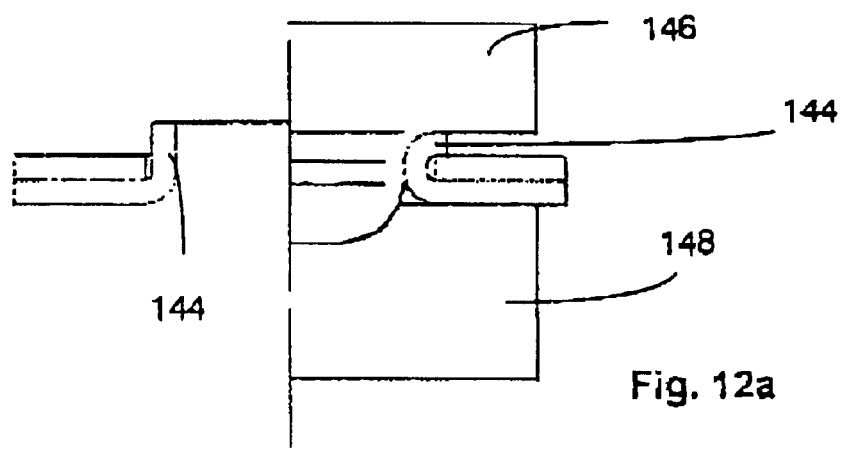
Figure 12B:
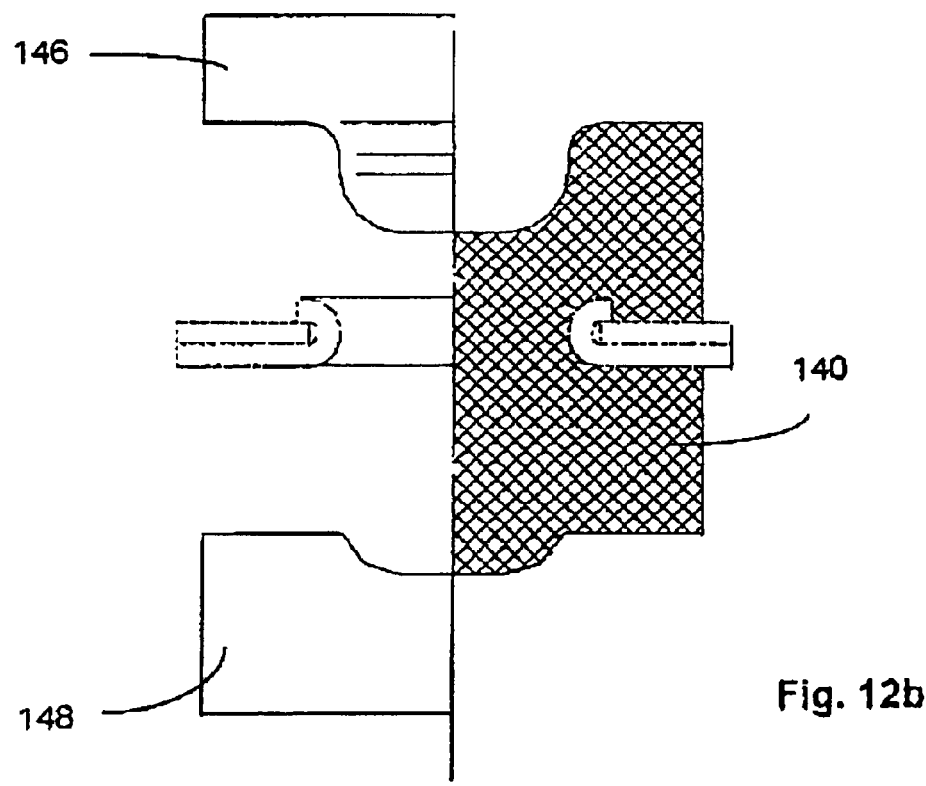
Figure 13:
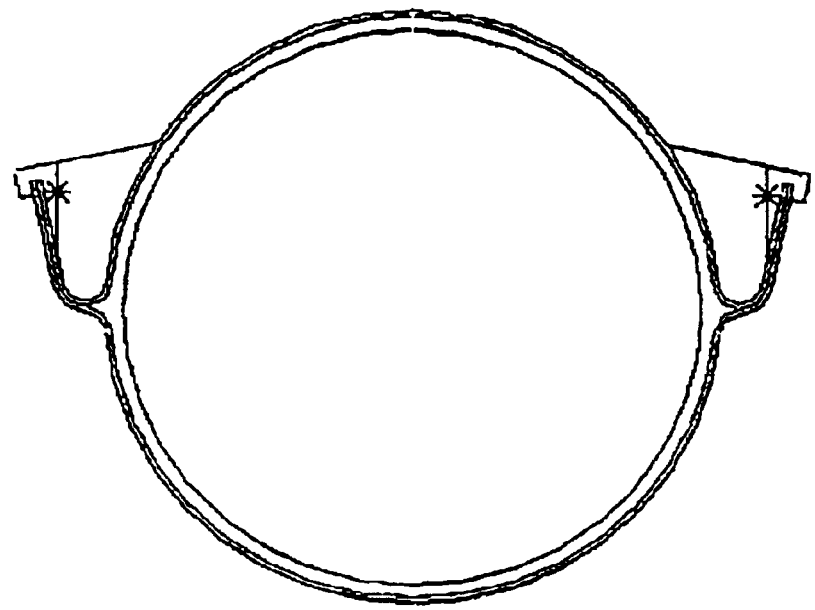
Figure 14:
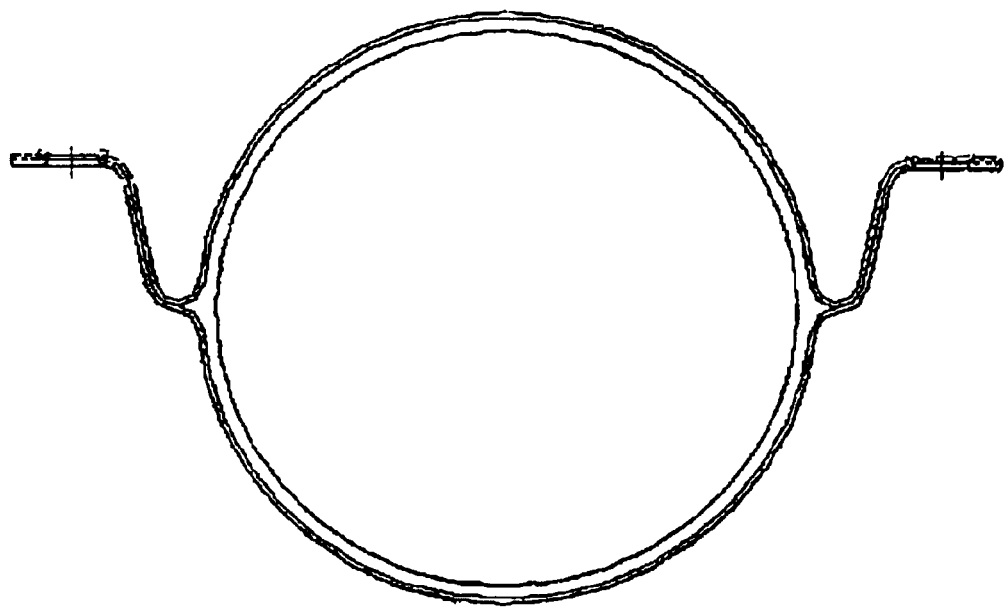
Figure 15:
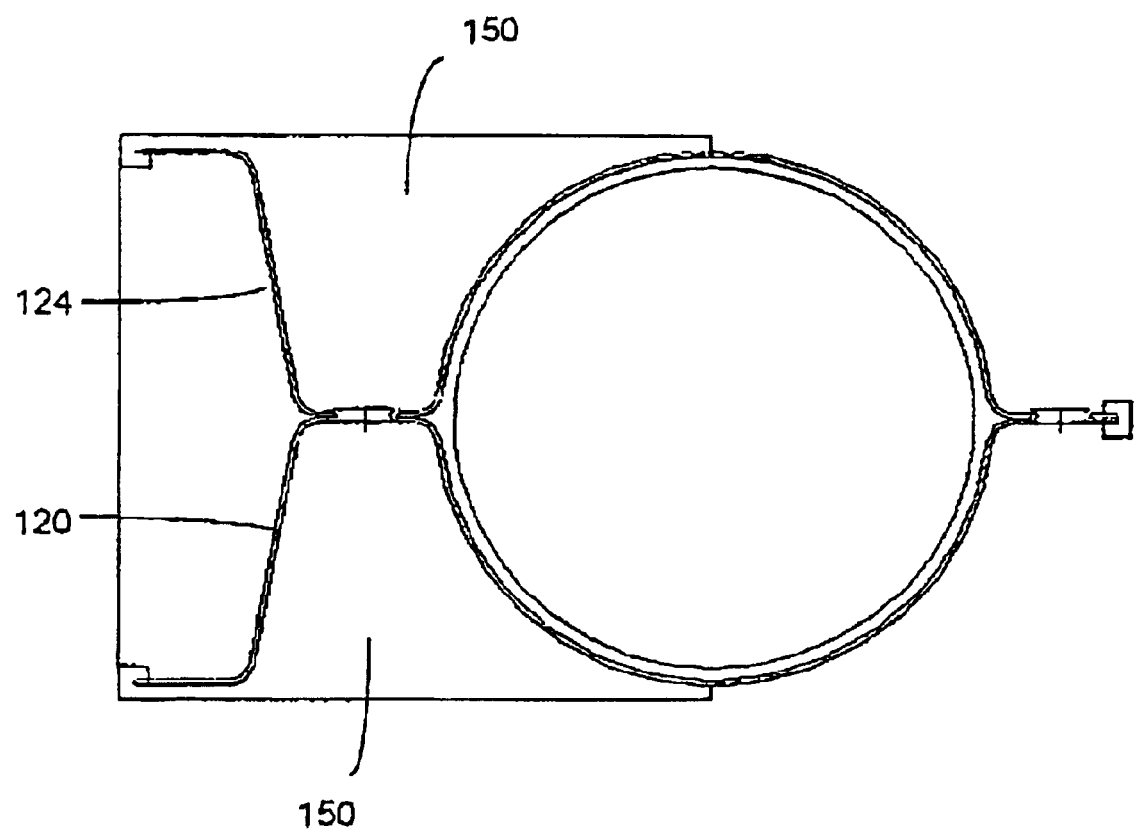
Figure 19:
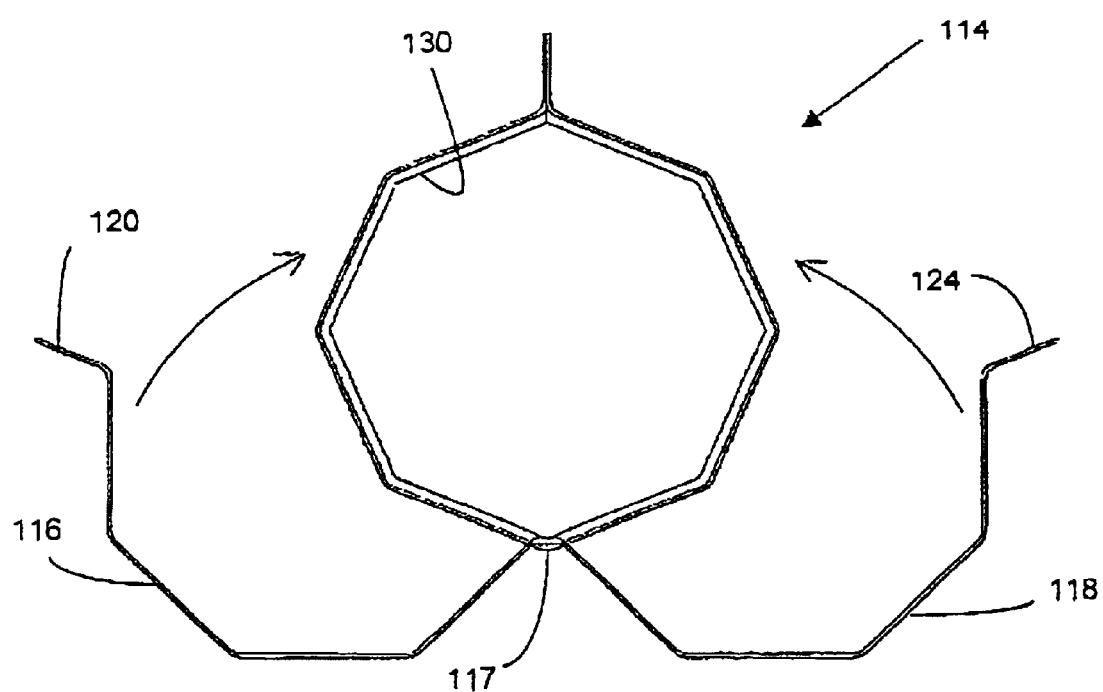
Figure 20:
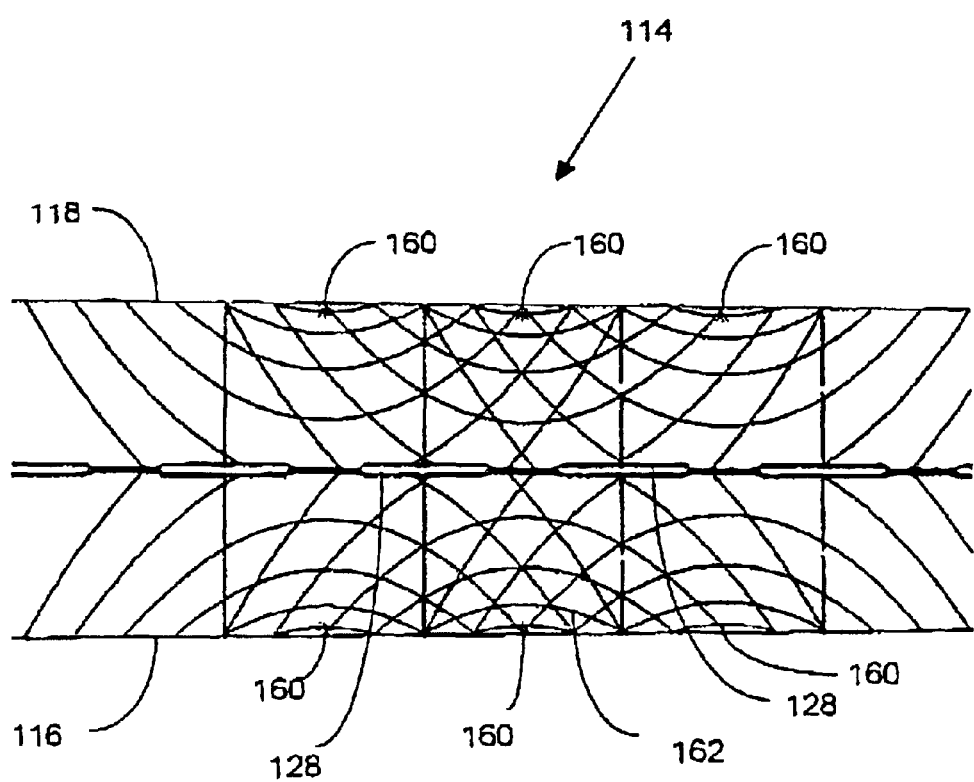

FIGS. 12a to b show cross sections of different embodiments of the connections of the half shells;

FIGS. 13 to 18 show views of different designs of the component with different edges and, if appropriate, additional ducts;

FIG. 19 shows a component having an unround cross section;

FIG. 20 shows an illustration of the plastic flow in the injection molding process.

In the exemplary embodiment illustrated, a component 10 according to the invention, which is illustrated in the drawing, is designed as a dashboard support and is referred to below as a crossmember. The crossmember 10 is arranged in a vehicle between the A-pillars of the vehicle (in a manner not illustrated) and can be secured thereon in a suitable manner. The direction of travel is indicated by the arrow 12.

The crossmember has a base body 14 which preferably consists of metal and is of essentially tubular design. Securing means, for example a steering-column securing means 16 and 17 and connection elements 18, 20, 21 for a front passenger's airbag are connected to the base body 14. These securing means and connection elements likewise essentially consist preferably of metal and are connected to the base body 14 in a suitable manner, for example are welded on. For reinforcement purposes and for better stiffening, reinforcing ribs made of plastic can be provided as, for example, indicated at the reference number 19. The securing means and connection elements can also be surrounded by the plastic, as a result of which the stiffness is increased, rattling is avoided and protection of the edges is provided.

The base body 14 is lined on the inside with plastic 22 and forms a duct 24 having inner walls 25 for guiding media, for example air. The plastic can be introduced into the base body 14 in an injection molding process. As an alternative and depending on the type of plastic, the latter may also be foamed in place, cast in place or introduced in a similar manner, as already explained in detail at the beginning. By way of example, in the following description only the injection in the injection molding process is explained without being restricted thereto.

Furthermore, the base body 14 has a multiplicity of apertures which are penetrated by the plastic, as is illustrated, for example, at the reference numbers 26 and 28. At 26 and 28, the plastic virtually forms a rivet, so that the plastic is connected fixedly to the base body 14.

The base body 14 has a further multiplicity of apertures which are likewise penetrated by the plastic, but which form a securing means on the outside of the crossmember 14, as is indicated, for example, at 30 or 32. The securing means 30 and 32 are illustrated schematically here as simple eyelets and hooks. The most varied shapes are conceivable for the securing means.

Furthermore, the crossmember has, approximately centrally, a relatively large opening 34 adjoined by a plastic shell 36. This plastic shell 36 can form part of a housing for an air conditioning system (not illustrated further) from which conditioned air can be introduced into the duct 24. The air is guided through the duct 24 to outlet openings 40, 42, 44, 46 provided in the crossmember. The outlet openings are adjoined by respective air-outlet connecting branches 50, 52, 54, 56 which preferably likewise consist of the plastic.

All of the plastic parts, such as the duct inner walls 25, rivets 26, 28, securing means 30, 32, housing parts 36, air-outlet connecting branches 50, 52, 54, 56, reinforcing ribs 19 are injected in a single injection molding process. For the production, first of all the base body is formed and provided with the appropriate openings. The securing means consisting of metal are then welded on, riveted, attached by Tox clinching, screwed or fastened in a similar manner. The base body is subsequently inserted into a corresponding injection mold and all of the plastic parts are injection molded onto the base body in an injection process.

Figure 4:
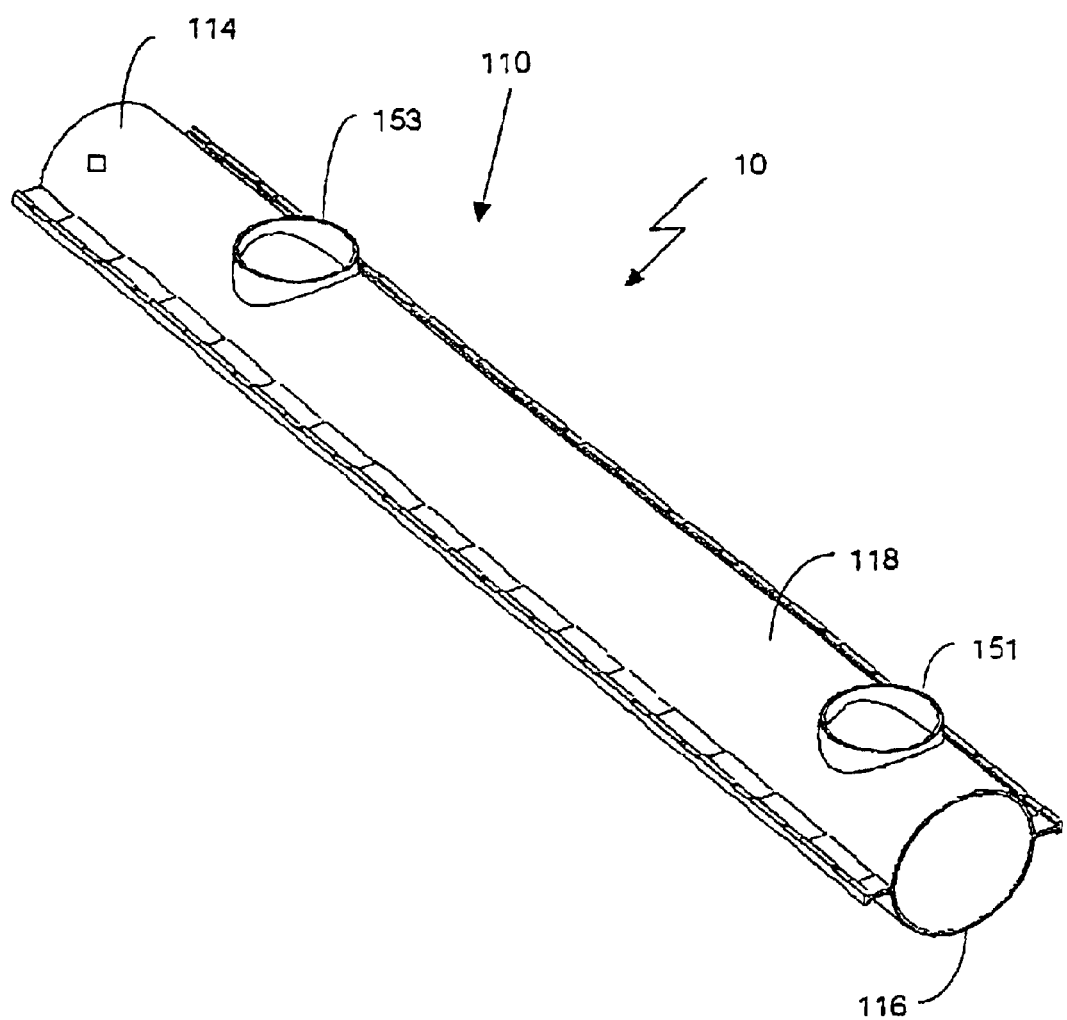
FIG. 4 shows a view of an embodiment of the component according to the invention with two half shells.
Figure 5:
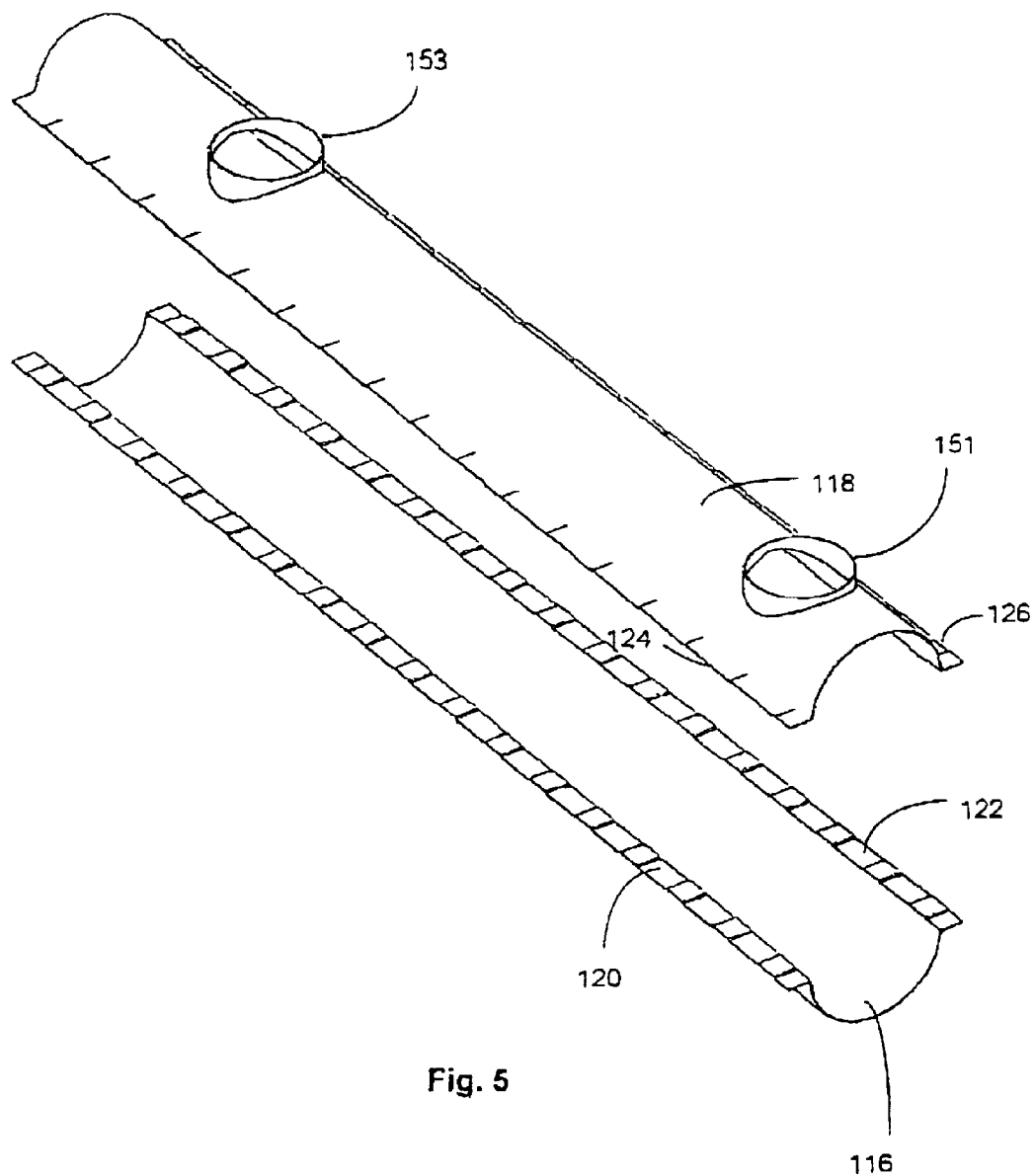
FIG. 5 shows the two half shells of the component from FIG. 4 in an exploded illustration.
Figure 6:
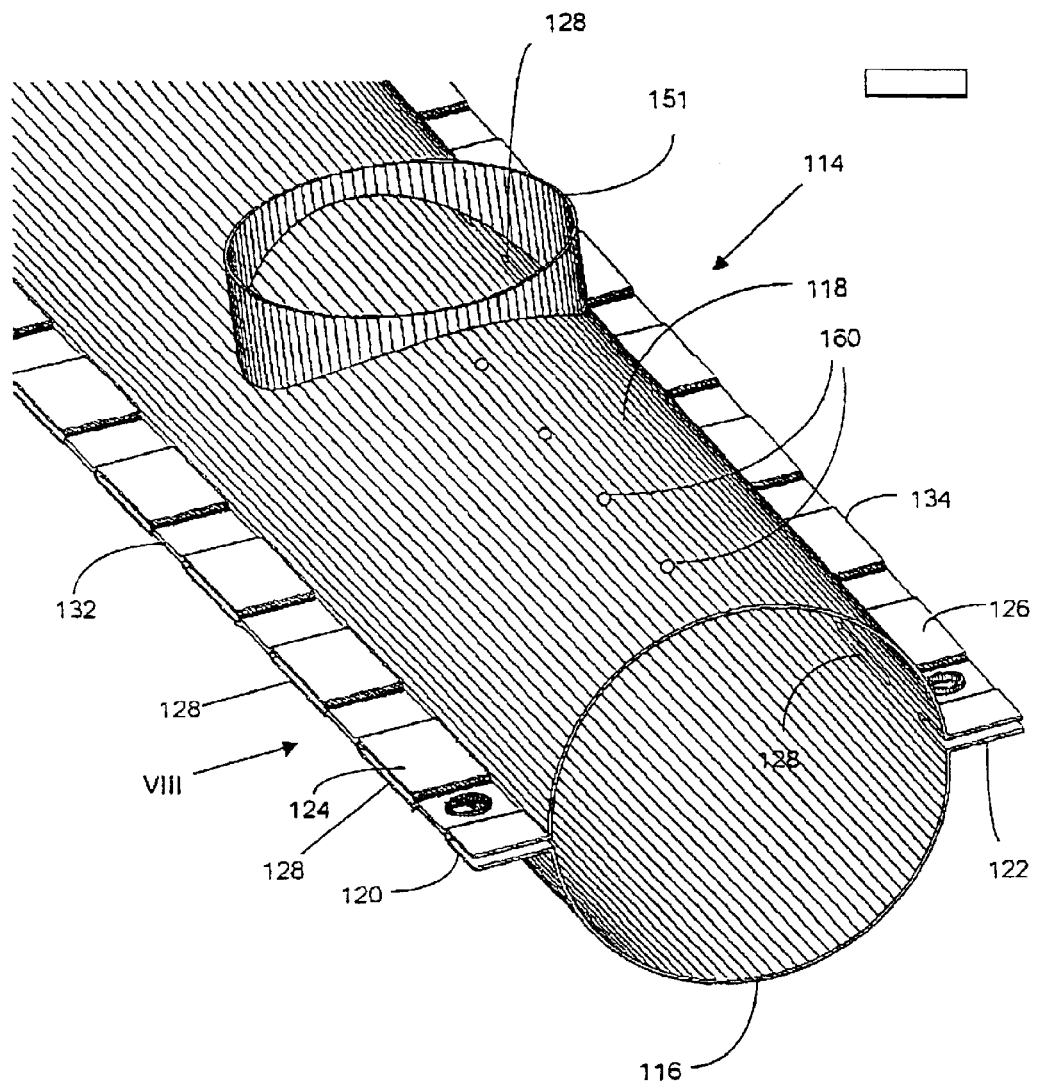
FIG. 6 shows the two half shells of the component from FIG. 4 illustrated joined together.
Figure 8:
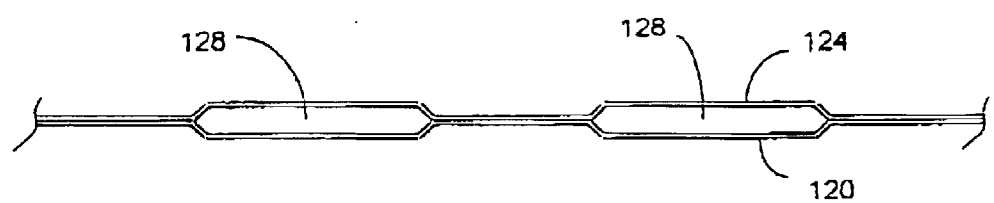
FIG. 8 shows a view of the edges of the two half shells from the view VIII from FIG. 6.

In a further, preferred embodiment of the invention, the base body 114, which forms the duct, of the component 110 according to the invention is of two-part design (FIG. 4) and comprises a first and second half shell 116 and 118 which are illustrated individually in FIG. 5. The half shells 116 and 118 each have angled longitudinal edges 120 and 122 or 124 and 126 which lie adjacent to one another during the formation of the tubular base body 14, as illustrated in FIG. 6. The longitudinal edges 120, 122, 124 and 126 are shaped in such a manner that when they lie adjacent to one another (FIG. 6) vents 128 remain free, as is illustrated in detail in FIG. 8. The function of these vents 128 will be explained in greater detail further below during the description of the production process. Air-outlet connecting branches 151 and 153 can be provided in one or both half shells 116, 118.

Figure 9:
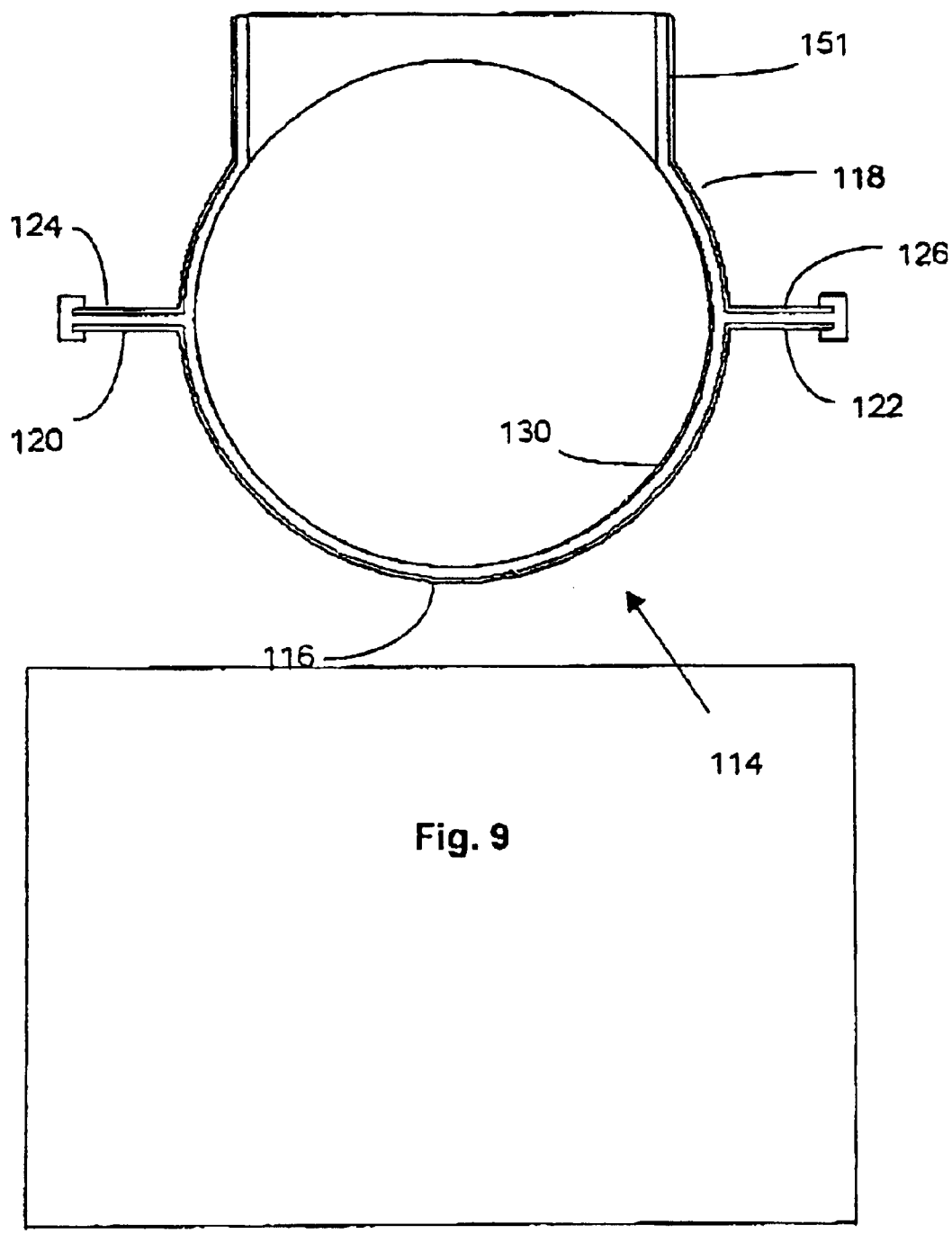
FIGS. 9 and 10 show cross sections along the lines IX—IX and X—X from FIG. 7.

As in the first exemplary embodiment, the tubular base body 114 is lined on the inside with a plastic 130, the plastic being injected in an injection molding process. In this case, the plastic 130 covers not only the insides of the base body 114 with its half shells 116 and 118, but also penetrates the vents 128 and engages around the outermost edges 132 and 134 of the angled edges 120, 122, 124 and 126, as can be seen, for example, in FIG. 7 and in the cross section in FIG. 9. This demonstrates a first option as to how the two half shells 116 and 118 can be connected to each other via the injected plastic 130.

Figure 7:
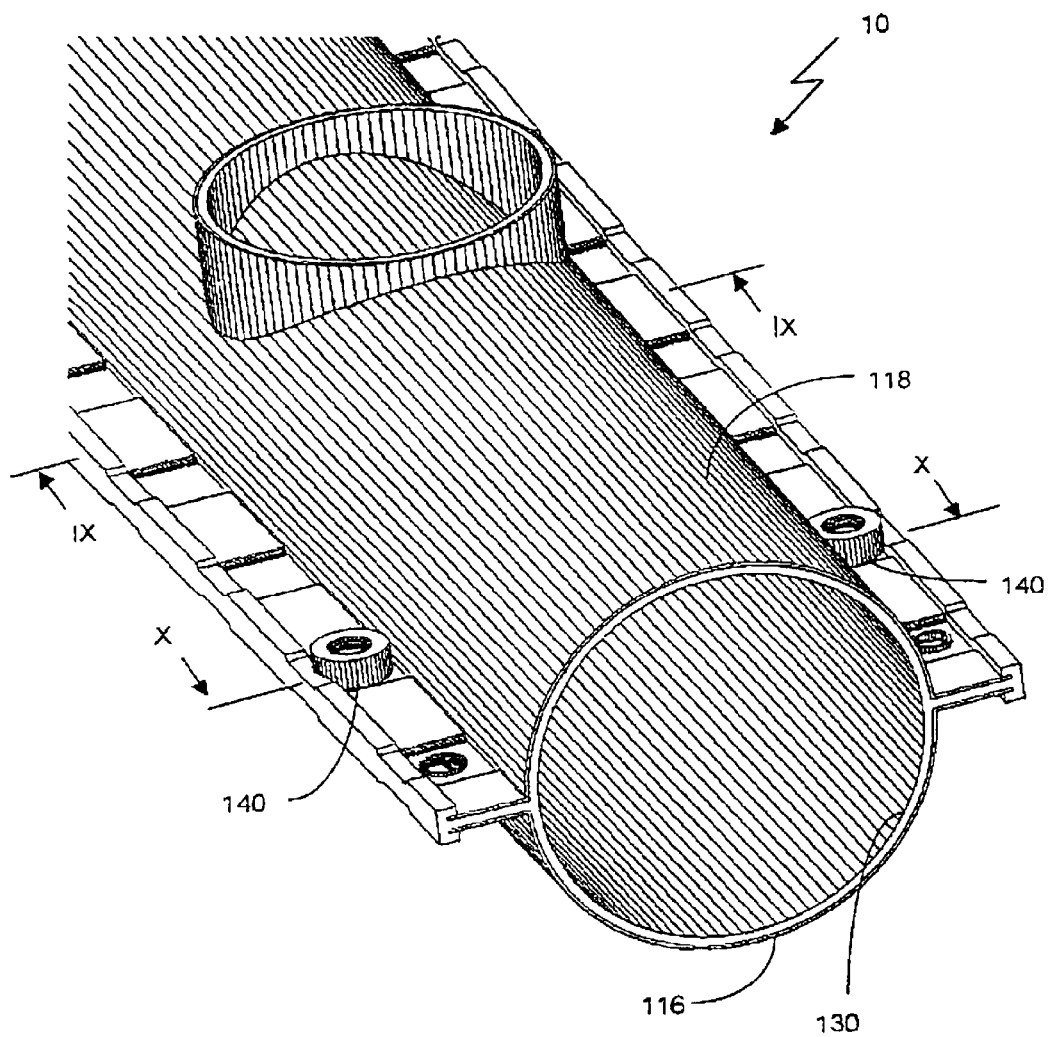
FIG. 7 shows a detailed view of the component from FIG. 4.
Figure 10:
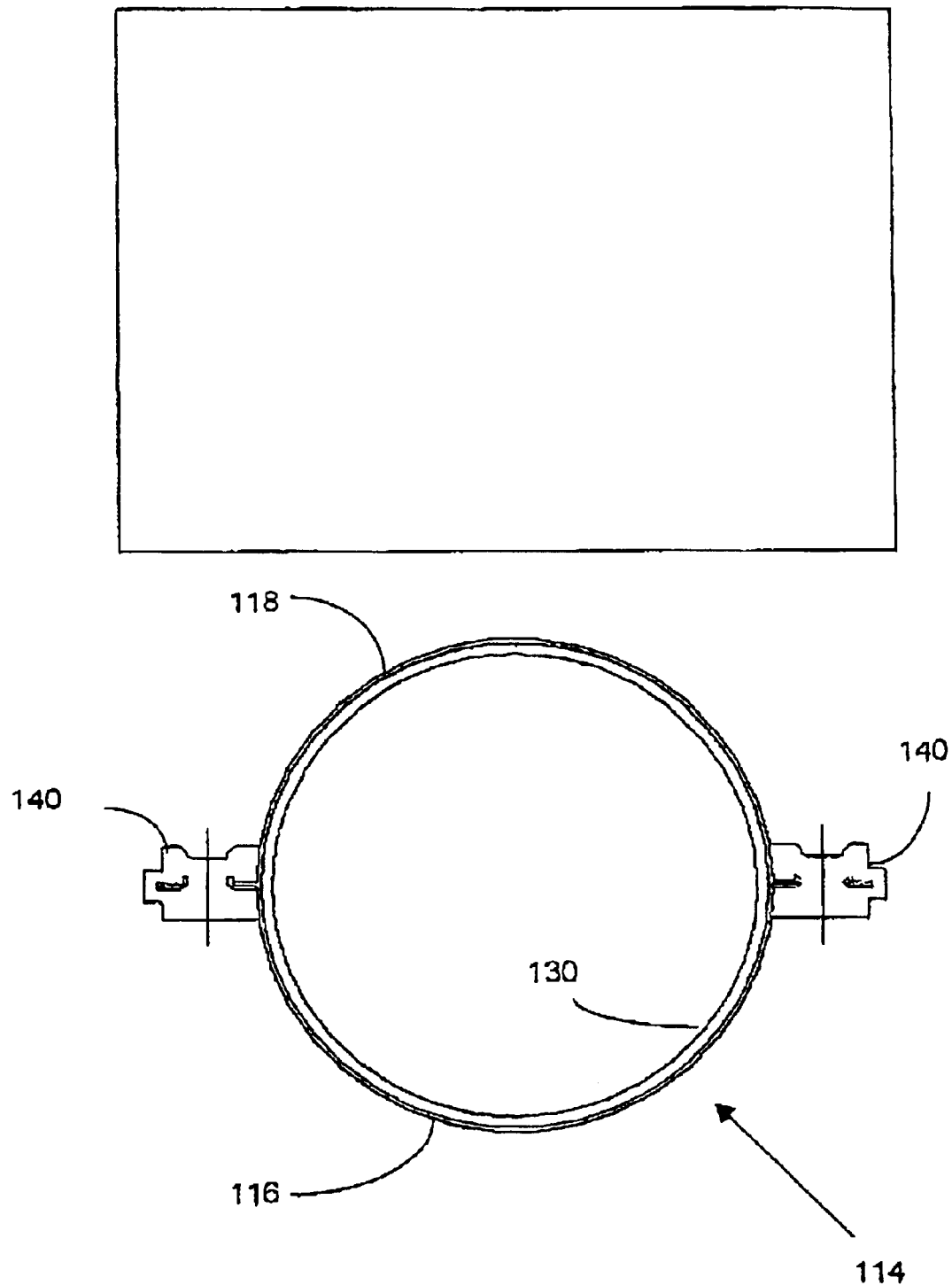

A second option for connecting the two half shells 116 and 118 is likewise illustrated in FIG. 7 and in the cross section in FIG. 10. Here, the angled side edges 120 and 124 or 122 and 126 have apertures 136 and 138 which correspond with one another in each case, as is illustrated in detail in FIG. 11c, for example. When the plastic 130 is injected, at the same time a plastic rivet 140 is injected into and around the apertures 136 and 138, so that a further connection option is provided via this plastic rivet 140. In this case, the apertures 136 and 138 can be designed differently in detail, as is illustrated in detail in the individual examples in FIGS. 11a, b and c. The apertures 136 and 138 can thus have passages 142 and 144 by means of which, if appropriate, the precise joining together of the half shells 116 and 118 can be simplified.

As illustrated in FIG. 12a, these passages can also be bent over via a die 146, for example after insertion of the half shells into an injection mold, in such a manner that at the same a mechanical connection between the two half shells 116 and 118 is produced. As indicated in FIG. 12b, the die and the associated die plate can be pulled back, after forming a flange around the passage 144, and can determine the outer shape of the subsequently injected plastic rivet 140.

The shape of the half shell 116 and 118 can be of different design in detail, as the illustrations in FIGS. 13 to 19 show, for example.

Thus, for example, the duct formed by the base body 114 can be not only round, but also polygonal, as illustrated in FIG. 19, for example. FIG. 19 likewise illustrates the possibility that the half shells 116 and 118 can be of integral design and can be pivoted toward each other along a hinge 117. Before the plastic 130 is injected, the half shells 116 and 118 are pivoted together in order to form the base body 114 into which the plastic 130 is then injected. In this embodiment, there is then only the angled longitudinal edges 120' and 124' on one longitudinal side of the base body 114.

Figure 16:
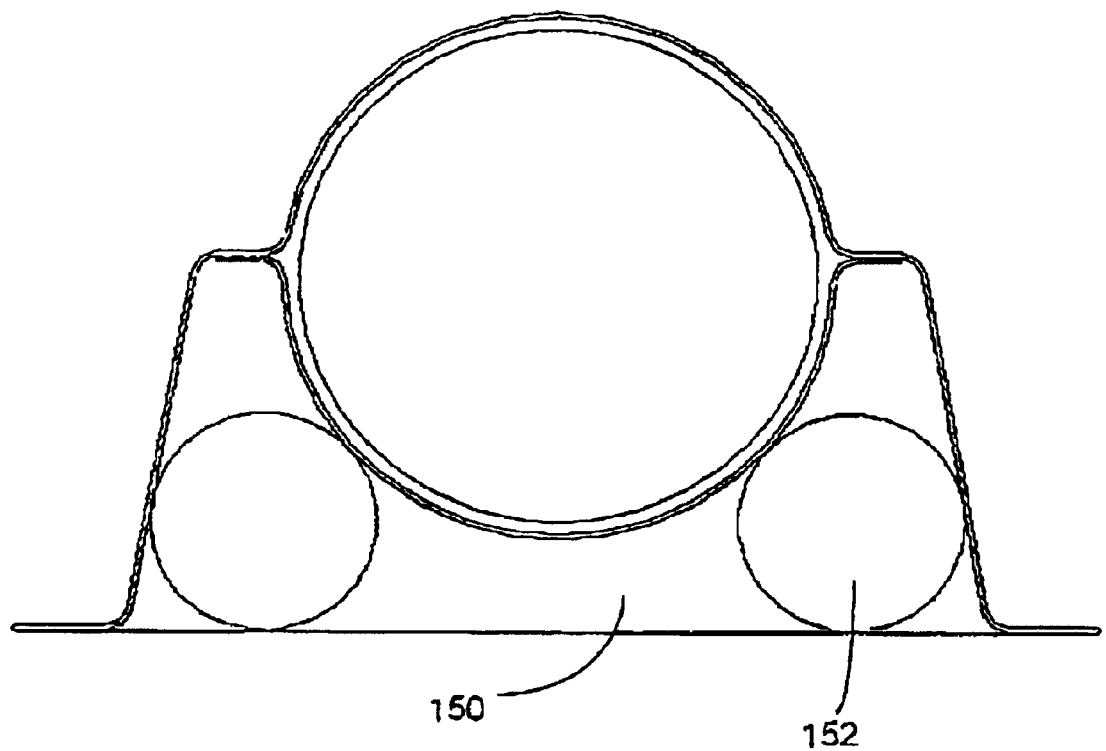
Figure 17:
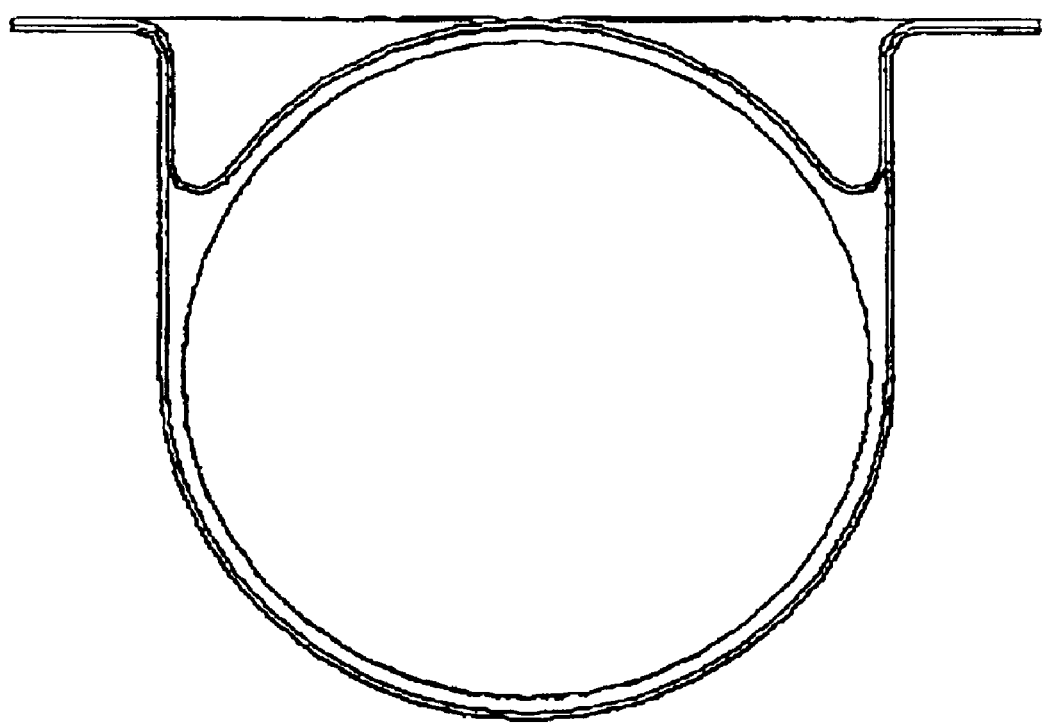

Furthermore, the longitudinal edges 120, 122, 124 and 126 of the half shells 116 and 118 can be designed in a very great variety of ways, as illustrated in FIGS. 13 to 18. In particular, they can be designed in such a manner that the longitudinal edges form connection points for further components, such as, for example, the steering column, airbag or the like. If the longitudinal edges are designed such that they project to a great extent, as is illustrated, for example, with the longitudinal edges 120 and 124 in FIG. 15, these edges 120 and 124 can be reinforced by plastic ribs 150, in which case the plastic ribs 150 are preferably injected in the same injection molding process. The reinforcing ribs 150 may moreover have openings 152, as illustrated in FIG. 16, so that, for example, cables can be guided parallel to the duct formed by the base body.

Figure 18:
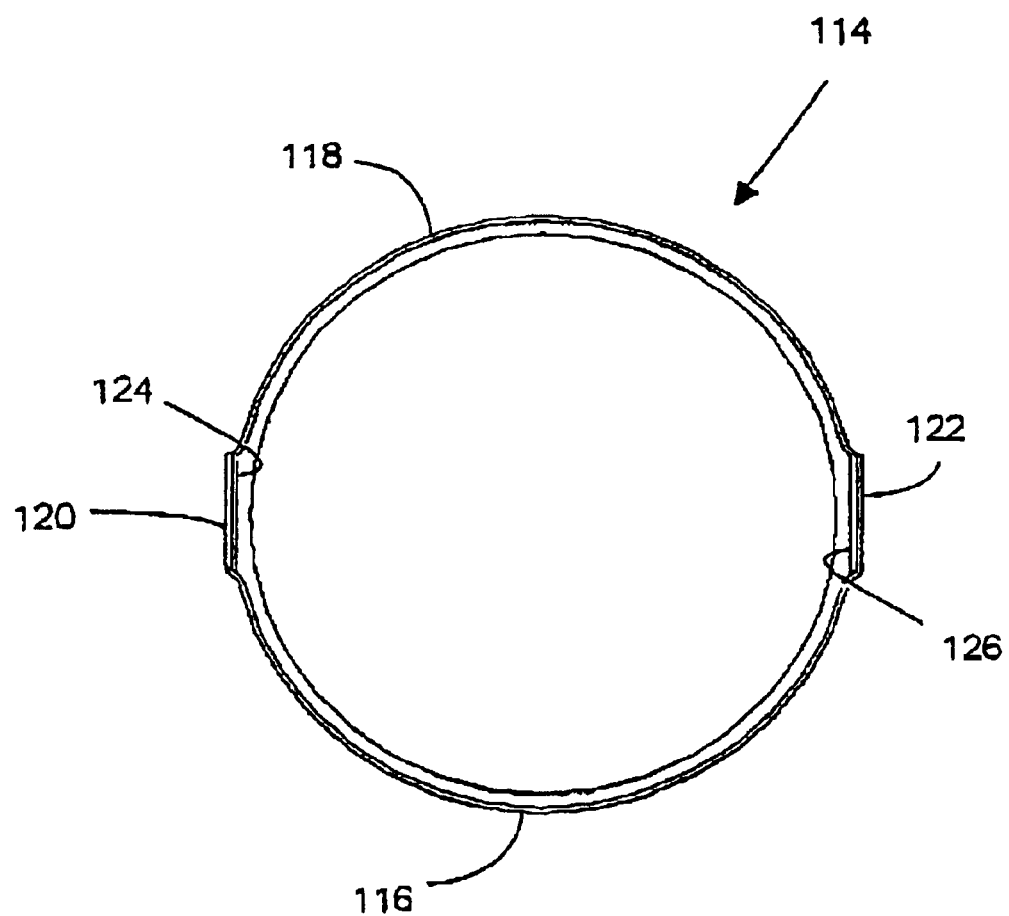

FIG. 18 shows an exemplary embodiment, in which the longitudinal edges 120, 122, 124 and 126 are not angled, but are formed in the direction of the circumference of the base body 114, with the result that the half shells 116 and 118 can be virtually inserted into one another. The connection of the half shells 116 and 118 can in turn be realized via rivet connections (not illustrated in greater detail) as are illustrated in FIGS. 11 and 12.

Figure 1:
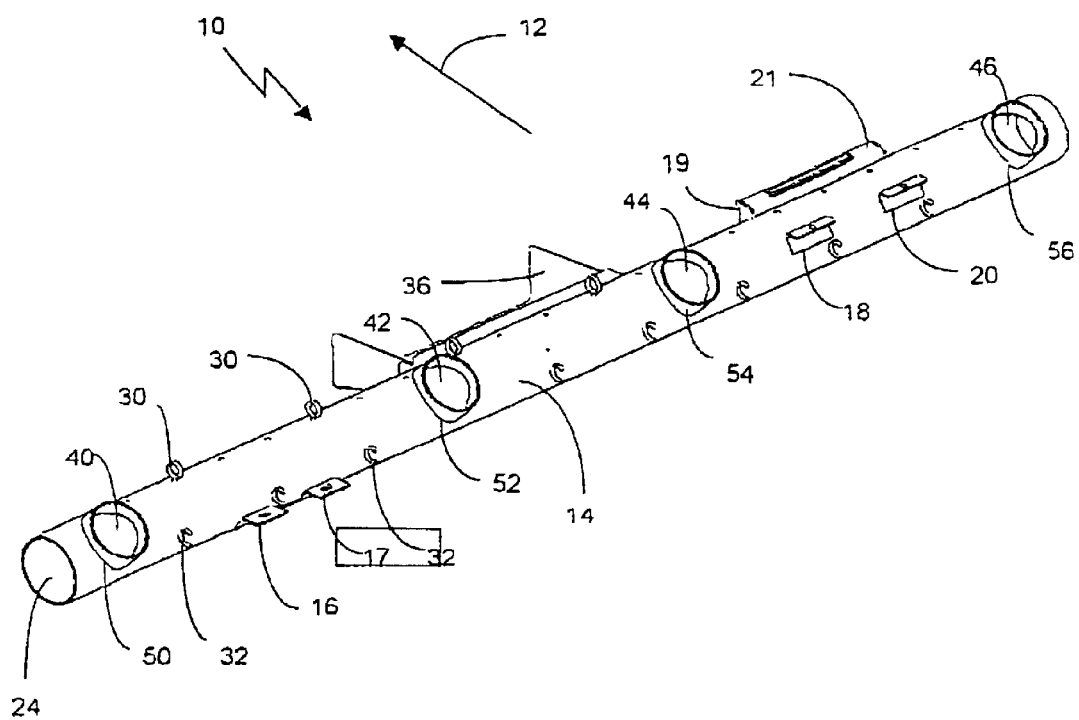
FIG. 1 shows a perspective view of a component according to the invention as a dashboard support.
Figure 2:
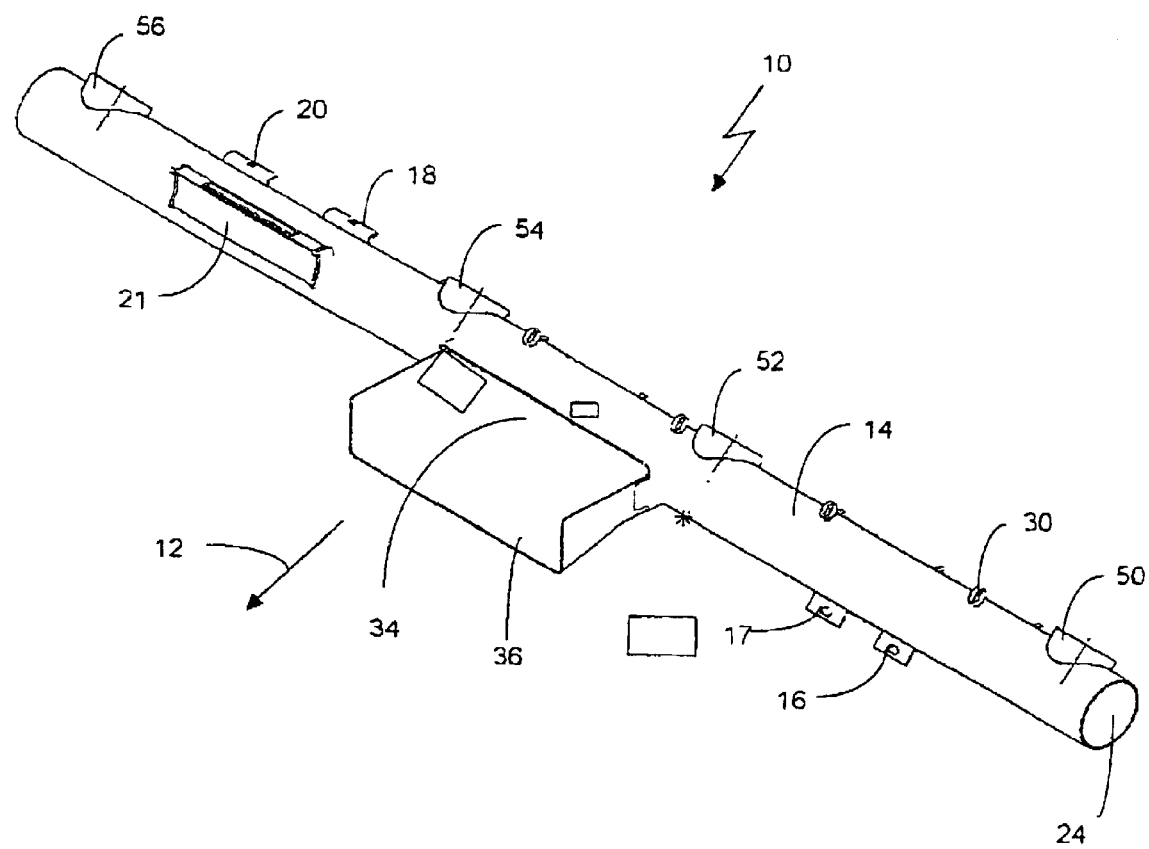
FIG. 2 shows a view as in FIG. 1 from a different perspective.
Figure 3:
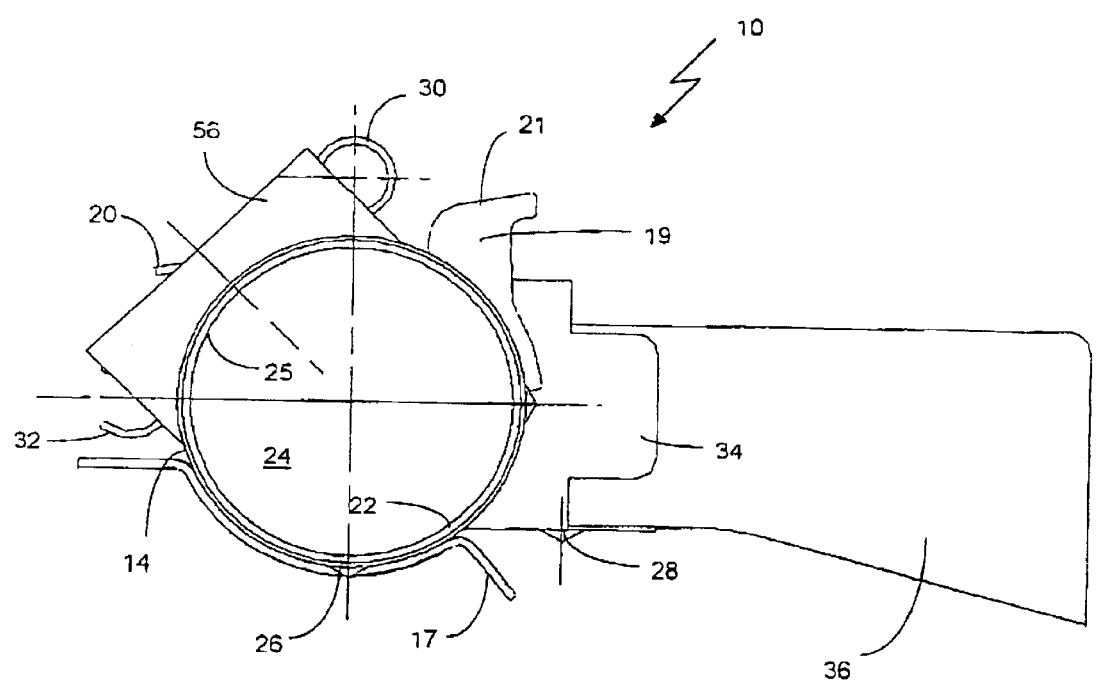
FIG. 3 shows a view of the component from FIG. 1 from the side.

This second embodiment 110 of the component according to the invention is produced essentially in precisely the same manner as the previously described embodiment with respect to FIGS. 1 to 3. First of all, the half shells 116 and 118 of the base body 114 are formed, for example in a deep-drawing process, and the corresponding securing means are attached, for example are welded on. The half shells 116 and 118 are subsequently inserted into the injection mold and the plastic 130 is injected, as a result of which the base body 140 is then lined on the inside with plastic and at the same time the two half shells 116 and 118 are connected to each other, as described above.

In a development of the process, it is advantageous if the half shells have injection openings 160 which are arranged, in the circumferential direction, central on at least one, preferably two half shells 116, 118 and are arranged, in the longitudinal direction, in each case between two vents 128. Then, as indicated by flow lines 162 in FIG. 20, the injected plastic can advantageously flow in a relatively unpressurized manner from the injection openings 160, in which case the air displaced in the injection molding process can escape through the vents 128. This makes possible a more reliable injection molding process in which the plastic can flow in an improved manner into all of the regions.

In one embodiment of the invention, after the half shells 116 and 118 have been inserted into the injection mold and before the plastic has been injection molded, calking of the passages 144, as indicated in FIGS. 12a and 12b and as already described further above, can also be provided.

What is claimed is:

1. A cross member for arrangement between A-pillars of a motor vehicle comprising:
   (a) an essentially tubular base body which comprises two half shells; and
   (b) plastic molded onto the inside of the base body so as to line the inside of the base body and thereby form walls for at least one duct;
   wherein the plastic comprises
   securing means, connection points, or housing parts of a heating or air conditioning system integrally molded onto the base body.

2. A cross member according to claim 1, wherein the base body comprises apertures penetrated by the plastic.

3. A cross member according to claim 1, wherein the base body, securing means or connection points comprise integrally molded-on, stiffening plastic rib.

4. A cross member according to claim 1, wherein the plastic comprises plastic introduced into the base body by an injection molding process.

5. A cross member according to claim 1, wherein the plastic comprises a foam material.

6. A cross member according to claim 5, wherein the foam material comprises a polyurethane foam or a particle foam.

7. A cross member according to claim 1, wherein the plastic comprises foam particles connected to one another via a binding agent.

8. A cross member according to claim 1, wherein the base body comprises connection points or securing means welded, clinched or otherwise joined to the base body before arrangement of the plastic inside the base body.

9. A cross member for arrangement between A-pillars of a motor vehicle comprising:
   (a) an essentially tubular base body which comprises two half shells;
   (b) plastic molded onto the inside of the base body so as to line the inside of the base body and thereby form walls for at least one duct
   wherein the base body comprises connection points or securing means welded, clinched or otherwise joined to the base body before arranaement of the plastic inside the base body; and wherein the plastic comprises ribs which stiffen the connection points or which stiffen the securing means.

10. A cross member according to claim 1, wherein the plastic connects the two half shells to each other.

11. A cross member according to claim 10, wherein the molded-on plastic connects the two half shells in the manner of rivets.

12. A cross member according to claim 11, wherein additional mechanical connections connect the two half shells.

13. A cross member according to claim 1, wherein the cross member further comprises vents arranged between adjacent edges of the two half shells.

14. A cross member according to claim 13, wherein the vents are at least partially filled with the plastic.

15. A cross member according to claim 13, wherein the vents are arranged at a distance from one another in the longitudinal direction.

16. A cross member according to claim 13, wherein the half shells comprise an injection opening arranged, in the circumferential direction, centrally on one half shell and arranged, in the longitudinal direction, between two vents.

17. A cross member according to claim 10, wherein adjacent edges of the two half shells comprise connection points for connection to further components.

18. A motor vehicle comprising a cross member according to claim 1, wherein the cross member comprises a rear closure module.

19. A motor vehicle comprising a cross member according to claim 1, wherein the motor vehicle further comprises A-pillars and wherein the cross member is arranged between the A-pillars.

20. A motor vehicle comprising a cross member according to claim 2, wherein the motor vehicle further comprises A-pillars and wherein the cross member is arranged between the A-pillars.

21. A motor vehicle comprising a cross member according to claim 3, wherein the motor vehicle further comprises A-pillars and wherein the cross member is arranged between the A-pillars.

22. A motor vehicle comprising a cross member according to claim 4, wherein the motor vehicle further comprises A-pillars and wherein the cross member is arranged between the A-pillars.

23. A motor vehicle comprising a cross member according to claim 5, wherein the motor vehicle further comprises A-pillars and wherein the cross member is arranged between the A-pillars.

24. A motor vehicle comprising a cross member according to claim 6, wherein the motor vehicle further comprises A-pillars and wherein the cross member is arranged between the A-pillars.

25. A motor vehicle comprising a cross member according to claim 7, wherein the motor vehicle further comprises A-pillars and wherein the cross member is arranged between the A-pillars.

26. A motor vehicle comprising a cross member according to claim 8, wherein the motor vehicle further comprises A-pillars and wherein the cross member is arranged between the A-pillars.

27. A motor vehicle comprising a cross member according to claim 9, wherein the motor vehicle further comprises A-pillars and wherein the cross member is arranged between the A-pillars.

28. A motor vehicle comprising a cross member according to claim 10, wherein the motor vehicle further comprises A-pillars and wherein the cross member is arranged between the A-pillars.

29. A motor vehicle comprising a cross member according to claim 11, wherein the motor vehicle further comprises A-pillars and wherein the cross member is arranged between the A-pillars.

30. A motor vehicle comprising a cross member according to claim 12, wherein the motor vehicle further comprises A-pillars and wherein the cross member is arranged between the A-pillars.

31. A motor vehicle comprising a cross member according to claim 13, wherein the motor vehicle further comprises A-pillars and wherein the cross member is arranged between the A-pillars.

32. A motor vehicle comprising a cross member according to claim 14, wherein the motor vehicle further comprises A-pillars and wherein the cross member is arranged between the A-pillars.

33. A motor vehicle comprising a cross member according to claim 15, wherein the motor vehicle further comprises A-pillars and wherein the cross member is arranged between the A-pillars.

34. A motor vehicle comprising a cross member according to claim 16, wherein the motor vehicle further comprises A-pillars and wherein the cross member is arranged between the A-pillars.

35. A motor vehicle comprising a cross member according to claim 17, wherein the motor vehicle further comprises A-pillars and wherein the cross member is arranged between the A-pillars.

36. A cross member for arrangement between A-pillars of a motor vehicle according to claim 1, wherein the tubular base body comprises a metal base body.

37. A cross member for arrangement between A-pillars of a motor vehicle according to claim 36, wherein the metal base body comprises sheet metal.

38. A cross member for arrangement between A-pillars of a motor vehicle according to claim 36, wherein the plastic is bonded directly onto an inside of the metal base body to impart structural strength to the cross member.

39. A cross member for arrangement between A-pillars of a motor vehicle according to claim 37, wherein the plastic is bonded directly onto an inside of the metal base body to impart structural strength to the cross member.

* * * * *